United States Patent
Komatsu et al.

(10) Patent No.: US 6,360,678 B1
(45) Date of Patent: Mar. 26, 2002

(54) METHOD AND DEVICE FOR DISPOSING OF SCRAPPED GAS CONTAINER

(75) Inventors: Ikuo Komatsu; Tatsuhiko Hashimoto, both of Tokyo; Yuji Komori, Shiga; Junji Saida, Tokyo; Yasumasa Idei, Shiga, all of (JP)

(73) Assignees: Fuji Car Mfg. Co., Ltd.; Iwatani International Corporation, both of Osaka (JP)

( * ) Notice: Subject to any disclaimer, the term of this patent is extended or adjusted under 35 U.S.C. 154(b) by 0 days.

(21) Appl. No.: 09/763,349

(22) PCT Filed: Aug. 19, 1999

(86) PCT No.: PCT/JP99/04442

§ 371 Date: Feb. 20, 2001

§ 102(e) Date: Feb. 20, 2001

(87) PCT Pub. No.: WO00/10708

PCT Pub. Date: Mar. 2, 2000

(30) Foreign Application Priority Data

Aug. 21, 1998 (JP) .............................. 10-234804
Aug. 21, 1998 (JP) .............................. 10-234805

(51) Int. Cl.[7] .................................... F23G 5/02
(52) U.S. Cl. .................. 110/342; 110/219; 110/223; 110/237; 110/242; 110/116; 110/118
(58) Field of Search .................. 431/202, 5; 209/671, 209/672; 110/218, 219, 222, 223, 227, 228, 237, 242, 255, 259, 342, 116, 117, 118

(56) References Cited

U.S. PATENT DOCUMENTS

| | | | |
|---|---|---|---|
| 1,418,899 A | * | 6/1922 | Acken |
| 1,554,042 A | * | 9/1925 | Simon |
| 2,102,544 A | * | 12/1937 | Raisch .......................... 110/12 |
| 2,670,846 A | * | 3/1954 | Rienks et al. ................ 209/104 |
| 4,041,906 A | * | 8/1977 | Edwards ......................... 122/2 |
| 5,022,328 A | * | 6/1991 | Robertson .................... 110/232 |
| 5,388,537 A | * | 2/1995 | Larson et al. ................ 110/346 |
| 5,555,985 A | * | 9/1996 | Kobayashi ................... 209/667 |
| 5,556,039 A | * | 9/1996 | Minamimura et al. ........ 241/18 |

FOREIGN PATENT DOCUMENTS

| | | | | |
|---|---|---|---|---|
| JP | 56-15301 B2 | 4/1981 | ........... | B02C/19/12 |
| JP | 9-313972 | 12/1997 | ........... | B02C/18/40 |

\* cited by examiner

*Primary Examiner*—Denise L. Esquivel
*Assistant Examiner*—K. B. Rinehart
(74) *Attorney, Agent, or Firm*—McCormick, Paulding & Huber LLP

(57) ABSTRACT

A method and apparatus for crushing waste gas cans between a pair of rotating rollers installed in a treatment chamber and removing the residual gas and residual liquid from the waste gas cans. The atmosphere in each of a waste gas can loading chamber, which is adjacent to the treatment chamber, the treatment chamber and a discharge chamber is replaced with an inert gas, thereby maintaining the oxygen concentration in the treatment chamber within a low range in which the residual gas will not burn explosively. Crushing of the waste gas cans is carried out while the oxygen concentration in the treatment chamber is within the low range. The pair of rotating rollers have two rotating shafts disposed approximately parallel to each other and sprocket wheels disposed on each rotating shaft at regular spacings.

10 Claims, 4 Drawing Sheets

Fig. 6

| | | Treatment chamber gas replacement | Waste can loading | Loading chamber and discharge chamber gas replacement | Waste can treatment | Loading chamber and discharge chamber gas replacement | Treated can discharge | Termination process |
|---|---|---|---|---|---|---|---|---|
| Partitioning member at upper side of loading chamber | Open / Closed | | | | | | | |
| Partitioning member at lower side of loading chamber | Open / Closed | | | | | | | |
| Crushing rollers | Operate / Stop | | | | | | | |
| Transfer mechanism | Operate / Stop | | | | | | | |
| Partitioning member at upper side of discharge chamber | Open / Closed | | | | | | | |
| Partitioning member at lower side of discharge chamber | Open / Closed | | | | | | | |
| Loading chamber replacement gas supply valve | Open / Closed | | | | | | | |
| Treatment chamber replacement gas supply valve | Open / Closed | | | | | | | |
| Discharge chamber replacement gas supply valve | Open / Closed | | | | | | | |

METHOD AND DEVICE FOR DISPOSING OF SCRAPPED GAS CONTAINER

TECHNICAL FIELD

The present invention relates to a method and apparatus for treating waste gas cans by crushing. More particularly, the present invention relates to a method and apparatus capable of reliably rupturing cans containing a combustible gas or other fluid and of separating the cans and the fluid in a reduced period of time and further preventing explosive combustion of the combustible gas in the can rupturing process.

BACKGROUND ART

There are cans containing combustible gases (hereinafter referred to as "gas cans"), such as cans containing liquefied petroleum gas as a fuel for portable gas cooking stoves, gas lanterns and so forth, and cans containing liquefied petroleum gas or dimethyl ether as a propellant (aerosol cans and spray cans). If these cans are thrown away with the combustible gas remaining therein, explosive combustion often occurs in waste treating processes such as incineration and compression. It is desirable that gas cans be thrown away after all the gas contained therein has been used up. In actuality, however, there are not a few gas cans thrown away with the gas remaining therein. There are also many cases where gas cans are thrown away with the unused combustible gas filled therein because of the expiration of the time limit for use or due to other reasons.

To prevent explosive combustion of gas cans, waste treatment facilities for treating collected waste gas cans are conventionally provided with a treatment apparatus having rotating rollers with spike pins provided on the peripheral surfaces thereof or rotating rollers with rotary cutters. Gas cans are thrown into the treatment apparatus to bore the wall surfaces of the gas cans with the spike pins on the rotating rollers or to cut the gas cans with the rotary cutters, thereby releasing the gas from the cans. Thereafter, a compression process is carried out. The rotary cutters include a plurality of disk-shaped cutters, which are used to cut the gas cans into pieces of the order of several centimeters.

DISCLOSURE OF INVENTION (Problem to be Solved by the Invention)

Most of gas cans, such as liquefied petroleum fuel gas cans, aerosol cans, and spray cans, have various diameters ranging from 35 millimeters to 110 millimeters. When various gas cans having different diameters are mixedly thrown into the conventional treatment apparatus, gas cans having a larger diameter than a set value impose an excessive load on the rotating rollers, whereas gas cans having a smaller diameter than the set value cannot satisfactorily be crushed with the rotating rollers. In the case of gas cans thrown away in an unused state and hence still containing a large amount of liquid, the gas cans may be discharged from the treatment apparatus to the outside before all the liquid is released from the gas cans in the treatment apparatus. In such a case, the residual gas and the residual liquid may flow out from the treated cans and ignite and burn. The residual liquid may contaminate the surroundings of the treatment apparatus. In a shredder type treatment apparatus adapted to cut gas cans with disk-shaped cutters, the liquid contained in the gas cans can flow out easily. However, because the can walls are cut into pieces, chips produced when the can walls are cut get mixed in the liquid flowing out of the cans, causing clogging of the solid-liquid separation filter.

An object of the present invention is to solve the above-described problems associated with the prior art and provide rotating (crushing) rollers capable of efficiently and reliably crushing and rupturing gas cans having a large amount of residual gas and liquid and of separating the gas cans and the fluid contained therein (including a combustible gas and a liquid) from each other within a reduced period of time despite the varying diameters of gas cans thrown in between the rotating rollers.

Further, when waste gas cans are thrown into the conventional waste gas can treatment apparatus, air flows into the treatment apparatus. This air may ignite and burn the combustible gas released in the treatment apparatus. Liquefied petroleum gas, e.g. propane and butane, and dimethyl ether, which are filled in fuel gas cans, aerosol cans, spray cans, etc. are combustible over a wide range of mixing ratios with respect to air. In the treatment apparatus, there is a strong possibility of the combustible gas igniting and burning because of the presence of frictional heat generated when the gas cans are bored with the spike pins and sparks produced by impact between metals. Therefore, another object of the present invention is to provide a method and apparatus for treating waste gas cans safely in a treatment apparatus having a pair of rotating rollers by preventing ignition and burning of the combustible gas in the treatment process. Other objects and advantages of the present invention will become apparent from the following description and claims and with reference to the drawings.

(Means for Solving the Problem)

The treatment apparatus according to the present invention crushes a waste gas can between a pair of rotating rollers installed in a treatment chamber and removes a residual fluid from the waste gas can. The pair of rotating rollers have two rotating shafts disposed parallel to each other and sprocket wheels disposed on each of the rotating shafts at regular spacings. The pair of rotating rollers are placed in such a manner that each sprocket wheel on one rotating shaft enters the area between a pair of adjacent sprocket wheels on the other rotating shaft. The treatment apparatus according to the present invention may have one or a plurality of the following features:

(a) The dimension by which each sprocket wheel of one rotating roller 1 enters the area between a pair of adjacent sprocket wheels of the other rotating roller 2, that is, the dimension u of radial overlap between the sprocket teeth, is $$(1/4)h \leq u \leq (3/2)h, \text{ preferably } (3/4)h \leq u \leq h$$

where h is the height of the sprocket teeth.

(b) The waste gas can has a cylindrical shape with a diameter of from 35 millimeters to 110 millimeters.

(c) The waste gas can is a can for supplying a foam substance.

(d) The waste gas can includes not only a used gas can but also an unused gas can thrown away because of the expiration of the time limit for use or due to other reasons.

(e) The treatment apparatus further includes a loading chamber for loading the waste gas can, the loading chamber being adjacent to the top of the treatment chamber, a discharge chamber for discharging the waste gas can, the discharge chamber being adjacent to the bottom of the treatment chamber, inert gas supply means capable of supplying an inert gas to the treatment chamber, and gas discharge means capable of discharging gas from the treatment chamber.

(f) The residual fluid in the waste gas can includes a residual gas and a residual liquid, and the residual gas includes liquefied petroleum gas or dimethyl ether.

(g) The atmosphere in the treatment chamber is replaced with the inert gas, whereby the oxygen concentration in the treatment chamber is maintained within a low range in which the liquefied petroleum gas or dimethyl ether will not burn explosively, and crushing of the waste gas can is carried out while the oxygen concentration in the treatment chamber is within the low range.

(h) The treatment apparatus further includes a first partitioning member for opening and closing the inlet of the loading chamber, a second partitioning member for opening and closing the passage between the loading chamber and the treatment chamber, a third partitioning member for opening and closing the passage between the treatment chamber and the discharge chamber, and a fourth partitioning member for opening and closing the outlet of the discharge chamber.

(i) The inert gas supply means is capable of supplying the inert gas to the loading chamber and the discharge chamber separately, and the gas discharge means is capable of discharging gas from the loading chamber and the discharge chamber separately.

(j) In a state where the waste gas can is received in the loading chamber and the atmosphere in the loading chamber has been replaced with the inert gas, the loading chamber and the treatment chamber are communicated with each other, and the waste gas can in the loading chamber is transferred to the treatment chamber.

(k) In a state where the atmosphere in the discharge chamber has been replaced with the inert gas, the discharge chamber and the treatment chamber are communicated with each other, and the treated gas can is transferred from the treatment chamber to the discharge chamber.

(l) The treatment apparatus includes a transfer mechanism capable of transferring the treated gas can from a lower part of the treatment chamber to an upper part of the discharge chamber.

(m) The treatment apparatus includes means for drawing a liquid discharged from the waste gas can from the treatment chamber to a liquid reservoir below the treatment chamber.

(n) The treatment apparatus includes an incinerator for incinerating the gas discharged through the gas discharge means.

The waste gas can treatment method according to the present invention crushes a waste gas can between a pair of rotating rollers installed in a treatment chamber and removes a residual fluid from the waste gas can. The treatment method according to the present invention includes the step of providing a loading chamber for loading the waste gas can, the loading chamber being adjacent to the treatment chamber, a discharge chamber for discharging the waste gas can, the discharge chamber being adjacent to the treatment chamber, inert gas supply means capable of supplying an inert gas into the loading chamber, the treatment chamber and the discharge chamber, and gas discharge means capable of discharging gas from the loading chamber, the treatment chamber and the discharge chamber; the step of operating the inert gas supply means and the gas discharge means to replace the atmosphere in each of the loading chamber, the treatment chamber and the discharge chamber with the inert gas, whereby the oxygen concentration in the treatment chamber is maintained within a low range in which the residual gas will not burn explosively; and the step of crushing the waste gas can while the oxygen concentration in the treatment chamber is within the low range. The treatment method according to the present invention may include one or a plurality of the following features singly or in combination:

(1) The residual fluid includes a residual gas and a residual liquid, and the residual gas includes liquefied petroleum gas or dimethyl ether.

(2) The inert gas includes nitrogen gas or carbon dioxide gas, and the low range in which the residual gas will not burn explosively is an oxygen concentration range of not higher than 10%.

(3) The inert gas supply means is capable of supplying the inert gas to the loading chamber and the discharge chamber separately.

(4) The gas discharge means is capable of discharging gas from the loading chamber and the discharge chamber separately.

(5) In a state where the waste gas can is received in the loading chamber and the atmosphere in the loading chamber has been replaced with the inert gas, the loading chamber and the treatment chamber are communicated with each other, and the waste gas can in the loading chamber is transferred to the treatment chamber.

(6) In a state where the atmosphere in the discharge chamber has been replaced with the inert gas, the discharge chamber and the treatment chamber are communicated with each other, and the treated gas can is transferred from the treatment chamber to the discharge chamber.

(7) The pair of rotating rollers have two rotating shafts disposed parallel to each other and sprocket wheels disposed on each of the rotating shafts at regular spacings, and the pair of rotating rollers are placed in such a manner that each sprocket wheel on one rotating shaft enters the area between a pair of adjacent sprocket wheels on the other rotating shaft.

(8) The treated gas can in the treatment chamber is transferred from a lower part of the treatment chamber to the discharge chamber through a transfer mechanism.

(9) The liquid discharged from the waste gas can in the treatment chamber is received in a liquid reservoir.

(10) The gas discharged through the gas discharge means is incinerated.

BRIEF DESCRIPTION OF DRAWINGS

FIG. 6 is a chart showing the operating timing of each part of the treatment apparatus.

BEST MODE FOR CARRYING OUT THE INVENTION

Figure 1:
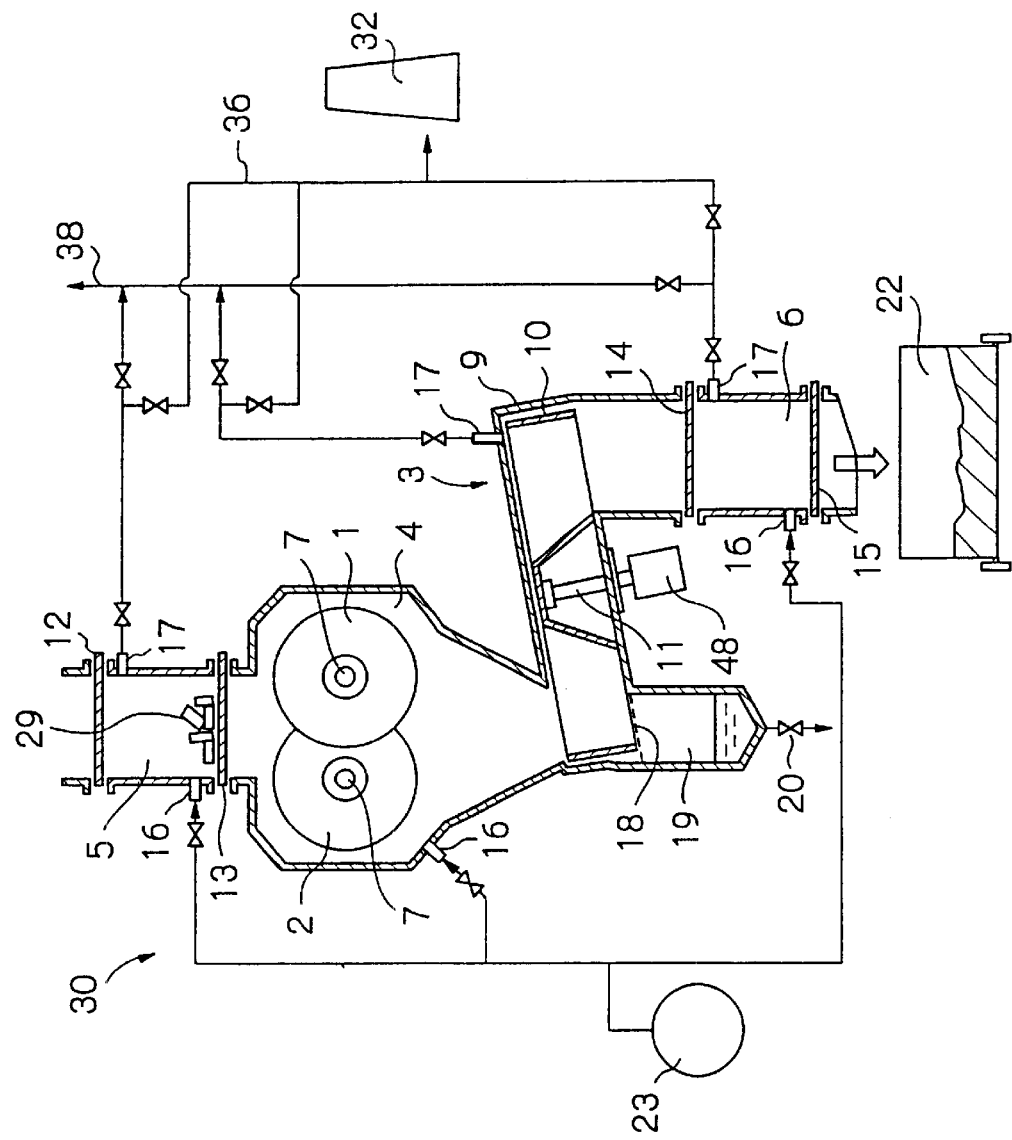
FIG. 1 is a diagram schematically showing the arrangement of a treatment apparatus according to a preferred embodiment of the present invention.

As shown in FIGS. 1 to 5, a treatment apparatus 30 according to a preferred embodiment of the present invention has a loading chamber 5 for loading gas cans 29, a treatment chamber 4 disposed beneath the loading chamber, a pair of rotating rollers (crushing rollers) 1 and 2 installed in the treatment chamber 4, a transfer mechanism 3, a discharge chamber 6 for discharging crushed cans, a liquid reservoir 19 disposed beneath the treatment chamber, and so forth.

Figure 2:
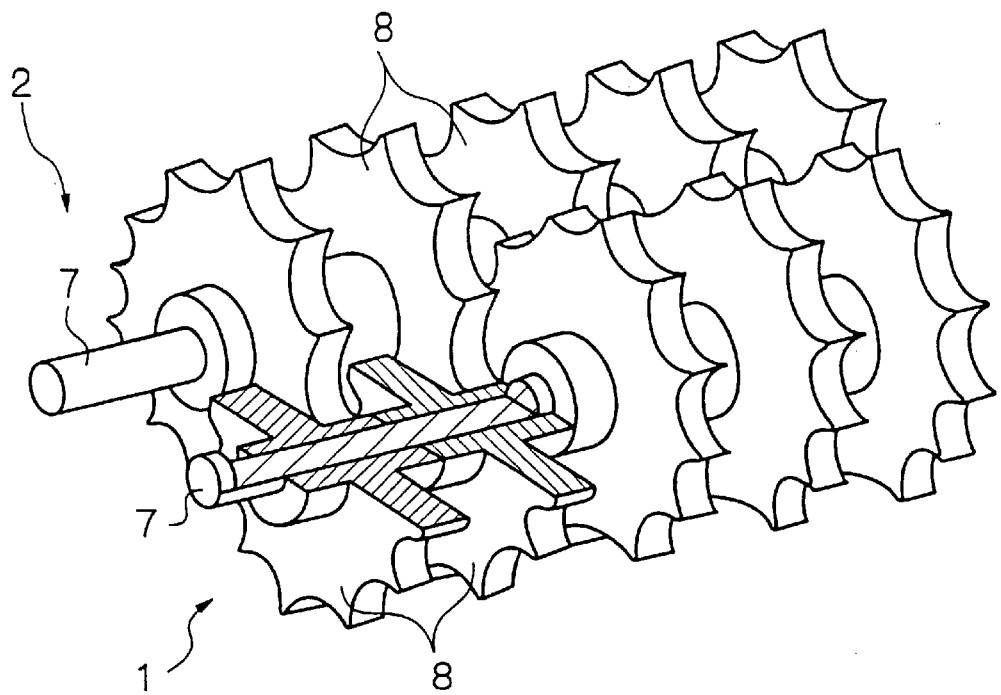
FIG. 2 is a perspective view showing a pair of rotating rollers in the treatment apparatus shown in FIG. 1.
Figure 3:
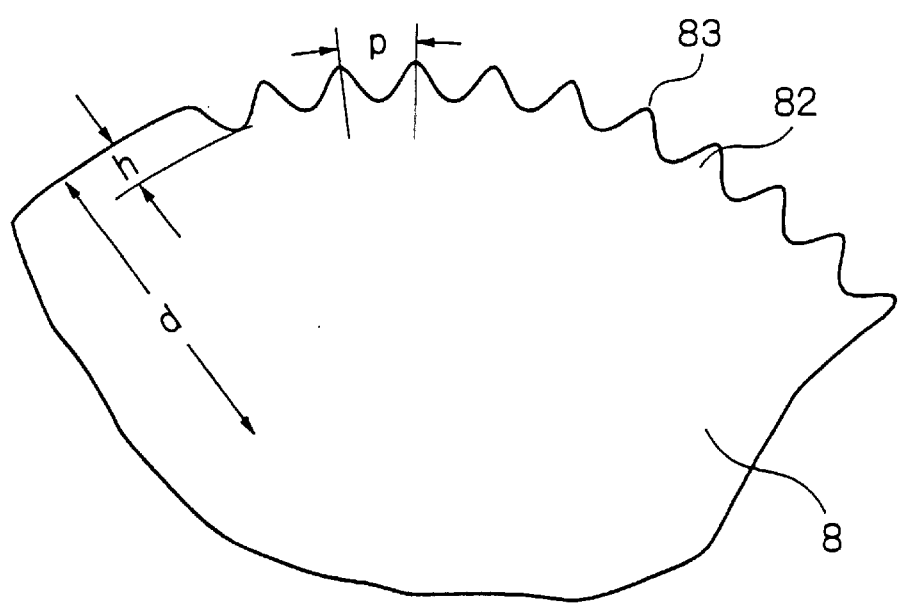
FIG. 3 is a fragmentary enlarged plan view of a sprocket wheel constituting a rotating roller.
Figure 4:
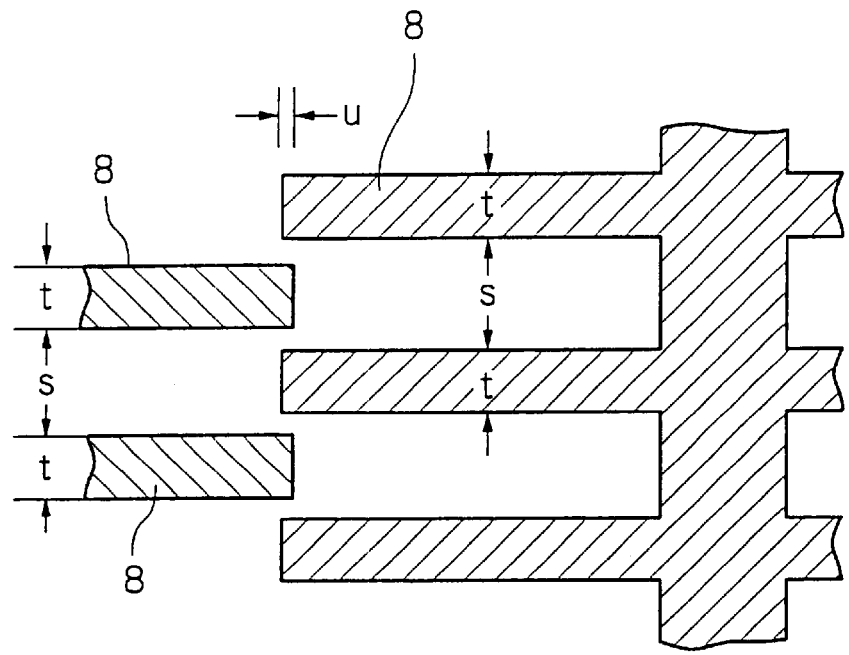
FIG. 4 is a fragmentary sectional view taken along a plane containing two axes of rotation of the pair of rotating rollers in the treatment apparatus shown in FIG. 1.

As shown in FIGS. 2 to 4, the pair of rotating (crushing) rollers 1 and 2 according to the embodiment of the present invention comprise a plurality of sprocket wheels 8 secured to each of two parallel rotating roller shafts 7 at regular spacings in the axial direction. The pair of rotating rollers 1 and 2 are placed in such a manner that each sprocket wheel 8 of one rotating roller 1 enters the area between a pair of adjacent sprocket wheels 8 of the other rotating roller 2 by a distance u (FIG. 4). Most of gas cans in urban waste have a diameter in the range of 35 millimeters to 110 millimeters. Dimensions of rotating rollers suitable for crushing gas cans having such dimensions are, for example, as follows. The diameter d of the sprocket wheels 8 is 600 to 700 millimeters. The height h of the teeth is 22 to 24 millimeters. The circumferential pitch of the tooth tips is 40 to 46 millimeters. The thickness t of the sprocket wheels is 24 to 30 millimeters. The spacing s between the sprocket wheels on the same shaft is 28 to 34 millimeters. The dimension by which each sprocket wheel 8 of one rotating roller 1 enters the area between a pair of adjacent sprocket wheels 8 of the other rotating roller 2, that is, the dimension u of the radial overlap between the sprocket teeth, as expressed in terms of the height h of the sprocket teeth, is $(1/4)h \leq u \leq (3/2)h$, preferably $(3/4)h \leq u \leq h$.

Figure 5:
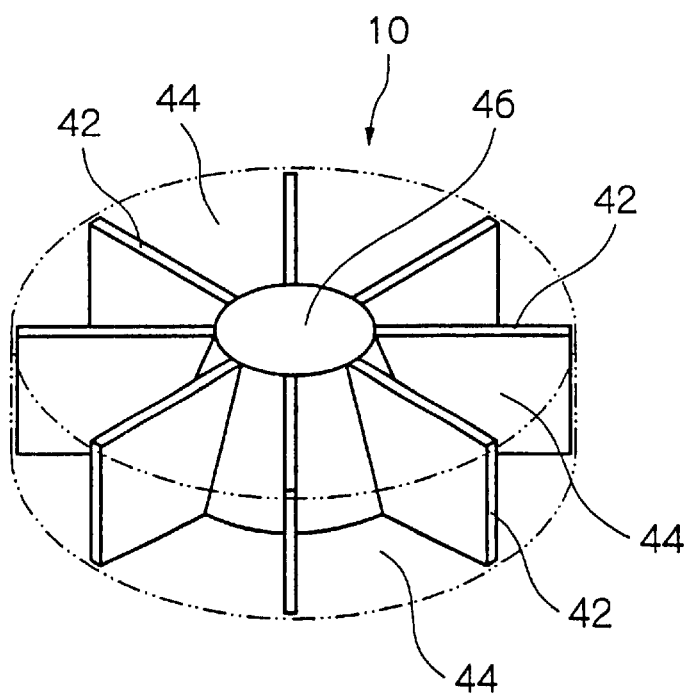
FIG. 5 is a perspective view showing a rotary frame member of a transfer mechanism in the treatment apparatus shown in FIG. 1.

The rotary transfer mechanism 3, as shown in FIGS. 1 and 5, comprises a rotary frame member 10 provided in a casing 9 at a slight tilt with respect to the vertical direction. The discharge chamber 6 is disposed somewhat apart from a position directly below the treatment chamber 4. The rotary frame member 10 is placed so as to rotate in an inclined plane that is lower at the lower side of the treatment chamber 4 than at the upper side of the discharge chamber 6. The rotary frame member 10 is rotated by a motor 48 through a rotating shaft 11. As shown in FIG. 5, the rotary frame member 10 has a boss portion 46 disposed around the rotating shaft and a plurality of blade plates 42 extending radially outward from the boss portion 46. A plurality of accommodating sections 44 are defined between the blade plates 42.

As shown in FIG. 1, the liquid reservoir 19 is positioned beneath the treatment chamber 4. The liquid reservoir 19 communicates with the treatment chamber 4 and the accommodating sections 44 of the rotary frame member 10. To receive treated cans in the accommodating sections 44, the ceiling wall of the casing 9 of the transfer mechanism 3 is opened in the lower part of the treatment chamber 4. The bottom wall of the rotary transfer mechanism 3 is opened directly above the discharge chamber 6. Crushed cans are dropped into the discharge chamber 6 from the accommodating sections 44 rotated to a position coincident with the opening directly above the discharge chamber 6. A partitioning member 12 is placed in an inlet portion of the loading chamber 5 through which the loading chamber 5 communicates with the outside. A partitioning member 13 is placed in an outlet portion of the loading chamber 5 through which the loading chamber communicates with the treatment chamber 4. The partitioning members 12 and 13 can open or hermetically close the inlet and outlet portions, respectively.

The liquid reservoir 19 is positioned directly below the treatment chamber 4 and below the rotary frame member 10. Because the rotary frame member has an inclined surface, the liquid from the crushed cans flows down the inclined surface of the rotary frame member while the cans are being moved by the rotary frame member 10. The liquid passes through drainage holes 18 and is collected in the liquid reservoir 19. The drainage holes 18 include openings extending through the bottom wall of the transfer mechanism 3 directly above the liquid reservoir 19. The openings are formed from a large number of small holes of wire netting or the like provided to prevent passage of the treated cans. The liquid collected in the liquid reservoir 19 is under surveillance to check the amount thereof and appropriately discharged to the outside of the treatment apparatus through a waste liquid valve 20.

A partitioning member 14 is placed in an inlet portion of the discharge chamber 6 through which the discharge chamber communicates with the treatment chamber 4. A partitioning member 15 is placed in an outlet portion of the discharge chamber 6 through which the discharge chamber 6 communicates with the outside. The partitioning members 14 and 15 can open or hermetically close the inlet and outlet portions, respectively. Inert gas inlet pipes 16 and gas outlet pipes 17 are communicated with the gas cans treatment chamber 4, the loading chamber 5 and the discharge chamber 6, whereby the atmosphere in each chamber can be replaced with an inert gas. Because liquefied petroleum gas and dimethyl ether are heavier than nitrogen gas, the gas outlet pipe 17 of the treatment chamber is disposed to communicate with the lower part of the treatment chamber or with the transfer mechanism 3, which communicates with the lower part of the treatment chamber.

A receiving container 22 is disposed beneath the discharge chamber 6, whereby the treated gas cans dropped from the discharge chamber 6 are received in the receiving container 22. The treatment apparatus 30 is provided with an inert gas supply source 23 comprising a nitrogen gas cylinder or a nitrogen gas generator, e.g. a membrane separation nitrogen generation apparatus, so that it is possible to supply nitrogen gas to the treatment chamber 4, the loading chamber 5 and the discharge chamber 6. The inert gas may be carbon dioxide gas besides nitrogen gas.

(Operating Procedure)

The operating procedure of the treatment apparatus 30 having the above-described arrangement will be described below. First, in a state where the partitioning member 13 between the loading chamber 5 and the treatment chamber 4 and the partitioning member 14 between the treatment chamber 4 and the discharge chamber 6 are closed, nitrogen gas is introduced into the treatment chamber 4 through the inert gas inlet pipe 16, and the atmosphere gas in the treatment chamber 4 is discharged through the gas outlet pipe 17, thereby reducing the oxygen concentration in the treatment chamber 4 to not higher than 10%.

Subsequently or in parallel to the above-described process, waste gas cans 29 are thrown into the loading chamber 5 with the partitioning member 13 between the loading chamber 5 and the treatment chamber 4 closed. The partitioning member 12 placed in the inlet portion of the loading chamber 5 is closed to seal the loading chamber 5. In this state, nitrogen gas is introduced into the loading chamber 5 from the inert gas inlet pipe 16 communicating with the loading chamber 5, and the atmosphere gas in the loading chamber 5 is discharged through the gas outlet pipe 17 and an exhaust pipe 38, thereby replacing the atmosphere gas in the loading chamber 5 with nitrogen gas and thus removing the oxygen component from the loading chamber. At this time, nitrogen gas is similarly supplied to the discharge chamber 6 through the inert gas inlet pipe 16, and the air in the discharge chamber is discharged through the gas outlet pipe 17 and the exhaust pipe 38, thereby replacing the atmosphere in the discharge chamber with nitrogen gas.

After the atmosphere in the loading chamber 5 has been replaced with nitrogen gas, the rotating rollers 1 and 2 and the transfer mechanism 3 are operated, and the partitioning member 13 between the loading chamber 5 and treatment chamber 5 and the partitioning member 14 between the treatment chamber 4 and the discharge chamber 6 are opened to allow the waste gas cans in the loading chamber 5 to drop into the treatment chamber 4. Because the inside of the loading chamber 5 is placed in the nitrogen gas atmosphere, the inside of the treatment chamber 4 is maintained in the low-oxygen concentration atmosphere. The waste gas cans are crushed by the rotating rollers 1 and 2 in the treatment chamber 4 and drop into the accommodating sections 44 of the transfer mechanism 3 where they are received. The operation of the transfer mechanism 3 causes the accommodating sections 44 to move from the lower part of the treatment chamber 4 to a position directly above the discharge chamber 6. Consequently, the treated waste gas cans in the accommodating sections 44 drop into the discharge chamber 6 where they are received.

As a result of the waste gas can crushing process in the treatment chamber 4, the residual liquefied gas in the waste gas cans is released through the gas release pipe 17. However, because the inside of the treatment chamber 4 is maintained in the low-oxygen concentration atmosphere, explosive combustion of the liquefied gas will not occur. The liquid flowing out of the waste gas cans in the treatment chamber 4 flows down the side walls of the lower part of the treatment chamber 4 and is received in the liquid reservoir 19. The liquid flowing out into the accommodating sections 44 of the transfer mechanism 3 passes through the drainage holes 18 provided in the bottom of the accommodating sections and is received in the liquid reservoir 19. The liquid in the liquid reservoir 19 is discharged appropriately by opening the discharge valve 20.

Next, the operation of the rotating rollers 1 and 2 and the transfer mechanism 3 is stopped, and the inlet-side partitioning member 14 of the discharge chamber 6 and the outlet-side partitioning member 13 of the loading chamber 5 are closed. Nitrogen gas is introduced into the loading chamber 5 and the discharge chamber 6 from the inert gas inlet pipes 16 communicating with these chambers, and the atmosphere gas in the loading chamber 5 and the discharge chamber 6 is discharged through the respective gas outlet pipes 17. Thus, the treatment chamber atmosphere gas mixed with the liquefied petroleum gas component, which has flowed into the loading chamber 5 and the discharge chamber 6, is replaced with nitrogen gas.

Upon completion of the replacement of the atmosphere gas in the loading chamber 5 and the discharge chamber 6, the outlet-side partitioning member 15 of the discharge chamber 6 is opened to allow the treated gas cans in the discharge chamber 6 to drop into the receiving container 22, thereby discharging the treated gas cans. Upon completion of the discharge of the treated gas cans from the discharge chamber 6, the outlet-side partitioning member 15 of the discharge chamber 6 is closed. Next, the inlet-side partitioning member 12 is opened, and waste gas cans are thrown into the loading chamber 5. The discharge of the treated gas cans from the discharge chamber 6 and the loading of waste gas cans into the loading chamber 5 can be carried out in parallel.

Upon completion of the discharge of the treated gas cans from the discharge chamber 6 and the loading of waste gas cans into the loading chamber 5, the outlet-side partitioning member 15 of the discharge chamber 6 and the inlet-side partitioning member 12 of the loading chamber 5 are closed, and the atmosphere gas in the loading chamber 5 and the discharge chamber 6 is replaced with nitrogen gas. During the discharge of the treated gas cans and the loading of waste gas cans, the external air flows into the discharge chamber 6 and the loading chamber 5. However, the external air is blocked by the partitioning member 13 and the partitioning member 14 and cannot enter the treatment chamber 4. Therefore, there is no possibility that the atmosphere in the treatment chamber 4 will have an oxygen concentration in the explosion region of liquefied petroleum gas.

Upon completion of the atmosphere gas replacement in the loading chamber 5 and the discharge chamber 6, the waste gas can treatment in the treatment chamber 4 is begun. Thereafter, the above-described procedure is repeated to treat waste gas cans. The treatment of waste gas cans causes the atmosphere in the treatment chamber 4 to become a liquefied petroleum gas mixture. Therefore, upon completion of the treatment of all waste gas cans, nitrogen gas is introduced into the treatment chamber 4 from the inert gas inlet pipe 16 communicating with the treatment chamber 4, and the atmosphere gas in the treatment chamber 4 is discharged through the gas outlet pipe (17), thereby replacing the atmosphere in the treatment chamber 4 with nitrogen gas.

The gas discharged during gas replacement is burned in a combustor 32 except during gas replacement at the time of starting the treatment in the treatment chamber 4 and during the first gas replacement in the loading chamber 5 and the discharge chamber 6. The treated gas cans delivered into the receiving container 22 are compressed into blocks with a scrap press (not shown).

FIG. 6 is a chart schematically showing the operating timing of each part of the treatment apparatus. The partitioning member at the upper (inlet) side of the loading chamber is closed except during the process of throwing waste gas cans into the loading chamber. The partitioning member at the lower side of the loading chamber (between the loading chamber and the treatment chamber) is closed except during the process of treating (crushing) waste gas cans in the treatment chamber. The rotating (crushing) rollers and the transfer mechanism are operated during the waste can treatment process. The partitioning member at the upper side of the discharge chamber (between the treatment chamber and the discharge chamber) is closed except during the process of treating (crushing) waste gas cans in the treatment chamber. The partitioning member at the lower side of the discharge chamber is closed except during the discharge of the treated gas cans from the discharge chamber. The gas supply valves of the loading chamber and the discharge chamber are opened to supply the inert gas during the process of replacing the atmosphere in the loading chamber and the discharge chamber with the inert gas (the process being carried out before and after the treatment process). The gas supply valve of the treatment chamber is opened to supply the inert gas during the process of replacing the atmosphere in the treatment chamber with the inert gas at the time of starting the operation and during a termination process carried out immediately before the operation of the apparatus is terminated.

ADVANTAGEOUS EFFECTS OF THE INVENTION

In the present invention, waste gas cans are supplied to a treatment chamber through a loading chamber. In the treatment chamber, the waste gas cans are crushed with a pair of rotating rollers. The treated gas cans are delivered from the treatment chamber through a discharge chamber. The gas in the loading chamber, the treatment chamber and the discharge chamber is replaced with an inert gas, whereby the inside of each of these chambers is maintained in an inert atmosphere. A combustible gas released from the waste gas cans crushed in the treatment chamber is prevented from igniting and burning by the inert atmosphere. Therefore, waste gas cans can be safely treated by crushing.

The pair of rotating rollers in the treatment chamber comprise a plurality of sprocket wheels disposed on each of Two parallel shafts at regular spacings. The pair of rotating rollers are placed in such a manner that each sprocket wheel of one rotating roller fits into the area between a pair of adjacent sprocket wheels of the other rotating roller. Waste gas cans are pressed and crushed flat while passing between the pair of rotating rollers. The rotating rollers having sprocket wheels can treat any of various gas cans thrown in therebetween that may differ in diameter from each other. In addition, there will be no large change in rotational torque of the rotating rollers.

The pair of rotating rollers having sprocket wheels fitting into each other apply force intensively to a part of the peripheral surface of each gas can with the tooth tips of the sprocket wheels. Accordingly, gas cans can be reliably bored and ruptured irrespective of the size of diameter, and the fluid in the cans flows out. The sprocket wheels apply large force (pressure) to a part of each can but do not apply force to the whole can. Therefore, driving force applied to the rotating rollers is small, and variations in rotational torque are also small.

The pair of rotating rollers, in which each sprocket wheel 8 of one rotating roller 1 enters the area between a pair of adjacent sprocket wheels 8 of the other rotating roller 2, are also suitable for treatment of aerosol products used in a foamy state, e.g. mousse type hair dressings, shaving creams and tire cleaners. In other words, the sprocket wheels instantaneously rupture gas cans extensively and allow the contained fluid to flow out. Accordingly, the generated gas and the foam material can hardly mix with each other. Consequently, foaming is minimized, and there will be no trouble due to foam in the treatment apparatus.

What is claimed is:

1. A method of crushing a waste gas can between a pair of rotating rollers installed in a treatment chamber and removing a residual fluid from the waste gas can, said method comprising:

providing a loading chamber for loading the waste gas can, said loading chamber being adjacent to the treatment chamber, a discharge chamber for discharging the waste gas can, said discharge chamber being adjacent to the treatment chamber, inert gas supply means capable of supplying an inert gas into the loading chamber, the treatment chamber and the discharge chamber, and gas discharge means capable of discharging gas from the loading chamber, the treatment chamber and the discharge chamber; and operating the inert gas supply means and the gas discharge means to replace an atmosphere in each of the loading chamber, the treatment chamber and the discharge chamber with the inert gas, whereby an oxygen concentration in the treatment chamber is maintained within a low range in which a residual gas will not bum explosively, and crushing the waste gas can while the oxygen concentration in the treatment chamber is within said low range, wherein said inert gas supply means is capable of supplying the inert gas to said loading chamber and discharge chamber separately, and the gas discharge means is capable of discharging gas from said loading chamber and discharge chamber separately, and wherein in a state where the waste gas can is received in the loading chamber and an atmosphere in the loading chamber has been replaced with the inert gas, the loading chamber and the treatment chamber are communicated with each other and the waste gas can in the loading chamber is transferred to the treatment chamber, and in a state where an atmosphere in the discharge chamber has been replaced with the inert gas, the discharge chamber and the treatment chamber are communicated with each other and the treated gas can is transferred from the treatment chamber to the discharge chamber.

2. A method according to claim 1, wherein said residual fluid includes a residual gas and a residual liquid, the residual gas including liquefied petroleum gas or dimethyl ether, the inert gas including nitrogen gas or carbon dioxide gas, and said low range is an oxygen concentration range of less than 10%.

3. A method according to claim 1, wherein the pair of rotating rollers have two rotating shafts disposed parallel to each other and sprocket wheels disposed on each of the rotating shafts at regular spacings, and the pair of rotating rollers are placed in such a manner that each sprocket wheel on one rotating shaft enters an area between a pair of adjacent sprocket wheels on the other rotating shaft.

4. A method according to claim 1, wherein the treated gas can in the treatment chamber is transferred from a lower part of the treatment chamber to the discharge chamber through a transfer mechanism, and a liquid discharged from the waste gas can in the treatment chamber is drawn from the treatment chamber and received in a liquid reservoir, and further the gas discharged through the gas discharge means is incinerated.

5. An apparatus for crushing a waste gas can between a pair of rotating rollers installed in a treatment chamber and removing a residual fluid from the waste gas can, which is characterized in that the pair of rotating rollers have two rotating shafts disposed parallel to each other and sprocket wheels disposed on each of the rotating shafts at regular spacings, and the pair of rotating rollers are placed in such a manner that each sprocket wheel on one rotating shaft enters an area between a pair of adjacent sprocket wheels on the other rotating shaft, the apparatus further including a loading chamber for loading the waste gas can, said loading chamber being adjacent to a top of the treatment chamber, a discharge chamber for discharging the waste gas can, said discharge chamber being adjacent to a bottom of the treatment chamber, inert gas supply means capable of supplying an inert gas to the treatment chamber, and gas discharge means capable of discharging gas from the treatment chamber, wherein a residual fluid in said waste gas can includes a residual gas and a residual liquid, the residual gas including liquefied petroleum gas or dimethyl ether, and an atmosphere in the treatment chamber is replaced with the inert gas, whereby an oxygen concentration in the treatment chamber is maintained within a low range in which said liquefied petroleum gas or dimethyl ether will not burn explosively, and crushing of the waste gas can is carried out while the oxygen concentration in the treatment chamber is within said low range, the apparatus further including a first partitioning member for opening and closing an inlet of the loading chamber, a second partitioning member for opening and closing a passage between the loading chamber and the treatment chamber, a third partitioning member for opening and closing a passage between the treatment chamber and the discharge chamber, and a fourth partitioning member for opening and closing an outlet of the discharge chamber, wherein said inert gas supply means is capable of supplying the inert gas to said loading chamber and discharge chamber separately, and said gas discharge means is capable of discharging gas from said loading chamber and discharge chamber separately, and wherein in a state where the waste gas can is received in the loading chamber and an atmosphere in the loading chamber has been replaced with the inert gas, the loading chamber and the treatment chamber are communicated with each other and the waste gas can in the loading chamber is transferred to the treatment chamber, and in a state where an atmosphere in the discharge chamber has been replaced with the inert gas, the discharge chamber and the treatment chamber are communicated with each other and the treated gas can is transferred from the treatment chamber to the discharge chamber.

6. An apparatus according to claim 5, wherein a dimension by which each sprocket wheel of said one rotating roller 1 enters an area between a pair of adjacent sprocket wheels of the other rotating roller 2, that is, a dimension u of radial overlap between sprocket teeth, is $$(1/4)h \leq u \leq (3/2)h,$$

where h is the height of the sprocket teeth.

7. An apparatus according to claim 5, wherein said waste gas can has a cylindrical shape with a diameter of from 35 millimeters to 110 millimeters.

8. An apparatus according to claim 5, wherein said waste gas can is a can for supplying a foam substance.

9. An apparatus according to claim 5, wherein said waste gas can includes not only a used waste gas can but also an unused gas can thrown away because of expiration of a time limit for use or due to other reasons.

10. An apparatus according to claim 5, further including a transfer mechanism capable of transferring the treated gas can from a lower part of the treatment chamber to an upper part of the discharge chamber, means for drawing a liquid discharged from the waste gas can from the treatment chamber to a liquid reservoir below the treatment chamber, and an incinerator for incinerating the gas discharged through the gas discharge means.

* * * * *

UNITED STATES PATENT AND TRADEMARK OFFICE
CERTIFICATE OF CORRECTION

PATENT NO. : 6,360,678 B1
DATED : March 26, 2002
INVENTOR(S) : Ikuo Komatsu, Tatsuhiko Hashimoto, Yuji Komori, Junji Saida and Yasumasa Idei It is certified that error appears in the above-identified patent and that said Letters Patent is hereby corrected as shown below:

Column 12,
Line 5, omit the number "1"
Line 6, omit the number "2"

Signed and Sealed this

Tenth Day of December, 2002

JAMES E. ROGAN
*Director of the United States Patent and Trademark Office*